(12) United States Patent
Nagarajan et al.

(10) Patent No.: US 8,931,045 B2
(45) Date of Patent: Jan. 6, 2015

(54) METHOD AND APPARATUS FOR MANAGEMENT OF MULTIPLE GROUPED RESOURCES ON DEVICE

(71) Applicants: Research In Motion Limited, Waterloo (CA); QNX Software Systems Limited, Ottawa (CA)

(72) Inventors: Sivakumar Nagarajan, Ottawa (CA); Christopher Lyle Bender, Kitchener (CA); Mark McConnaughay, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/768,353

(22) Filed: Feb. 15, 2013

(65) Prior Publication Data

US 2013/0227637 A1 Aug. 29, 2013

Related U.S. Application Data

(60) Provisional application No. 61/599,769, filed on Feb. 16, 2012.

(51) Int. Cl.
*H04L 12/66* (2006.01)
*G06F 21/74* (2013.01)
*G06F 21/62* (2013.01)
*G06F 21/31* (2013.01)
*G06F 21/00* (2013.01)
*H04L 12/24* (2006.01)

(52) U.S. Cl.
CPC ............... *G06F 21/00* (2013.01); *G06F 21/74* (2013.01); *G06F 21/6218* (2013.01); *G06F 21/31* (2013.01)
USPC .............................................. 726/1; 726/30

(58) Field of Classification Search
CPC combination set(s) only.
See application file for complete search history.

(56) References Cited

U.S. PATENT DOCUMENTS

| | | | |
|---|---|---|---|
| 4,945,556 A | 7/1990 | Namekawa |
| 5,864,765 A | 1/1999 | Barvesten |
| 5,987,440 A | 11/1999 | O'Neil et al. |
| 5,987,611 A | 11/1999 | Freund |
| 6,052,735 A | 4/2000 | Ulrich et al. |
| 6,105,132 A | 8/2000 | Fritch et al. |
| 6,233,446 B1 | 5/2001 | Do |

(Continued)

FOREIGN PATENT DOCUMENTS

| | | |
|---|---|---|
| CN | 101523878 A | 9/2009 |
| EP | 0973350 A1 | 1/2000 |

(Continued)

OTHER PUBLICATIONS

EP Application No. 12155659.1, Extended European Search Report dated Jan. 8, 2012.

(Continued)

*Primary Examiner* — Venkat Perungavoor
(74) *Attorney, Agent, or Firm* — Moffat & Co.

(57) ABSTRACT

A method and computing device for managing grouped resources comprising receiving, at the computing device, a policy for a set of grouped resources; applying the policy; locking at least one of the computing device or the set of grouped resources associated with the policy; waiting for receipt of an authentication parameter at the computing device; verifying the authentication parameter; associating the set of grouped resources with the authentication parameter; and unlocking the least one of the computing device or the set of grouped resources.

29 Claims, 9 Drawing Sheets

(56) References Cited

U.S. PATENT DOCUMENTS

| | | |
|---|---|---|
| 6,292,798 B1 | 9/2001 | Dockter et al. |
| 6,351,816 B1 | 2/2002 | Mueller et al. |
| 6,360,322 B1 | 3/2002 | Grawrock |
| 6,405,202 B1 | 6/2002 | Britton et al. |
| 6,412,070 B1 | 6/2002 | Van Dyke et al. |
| 6,516,421 B1 | 2/2003 | Peters |
| 6,647,388 B2 | 11/2003 | Numao et al. |
| 6,651,173 B1 | 11/2003 | Rodrigues et al. |
| 6,668,323 B1 | 12/2003 | Challener et al. |
| 6,757,821 B1 | 6/2004 | Akiyama et al. |
| 6,772,350 B1 | 8/2004 | Belani et al. |
| 6,795,688 B1 | 9/2004 | Plasson et al. |
| 6,795,967 B1 | 9/2004 | Evans et al. |
| 6,886,038 B1 | 4/2005 | Tabbara et al. |
| 6,957,330 B1 | 10/2005 | Hughes |
| 6,978,385 B1 | 12/2005 | Cheston et al. |
| 6,999,562 B2 | 2/2006 | Winick |
| 7,246,374 B1 | 7/2007 | Simon et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,574,535 B2 * | 8/2009 | Finkelstein ............... 710/15 |
| 7,734,284 B2 | 6/2010 | Adams et al. |
| 7,869,789 B2 | 1/2011 | Hassan et al. |
| 7,930,760 B2 * | 4/2011 | Coles et al. ............... 726/27 |
| 8,074,078 B2 | 12/2011 | Brown et al. |
| 2001/0047485 A1 | 11/2001 | Brown et al. |
| 2002/0019944 A1 | 2/2002 | Kou |
| 2002/0031230 A1 | 3/2002 | Sweet et al. |
| 2002/0087880 A1 | 7/2002 | Rhoades et al. |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2003/0005317 A1 | 1/2003 | Audebert et al. |
| 2003/0026220 A1 | 2/2003 | Uhlik et al. |
| 2003/0065676 A1 | 4/2003 | Gbadegesin et al. |
| 2003/0093698 A1 | 5/2003 | Challener et al. |
| 2003/0120948 A1 | 6/2003 | Schmidt et al. |
| 2003/0126437 A1 | 7/2003 | Wheeler et al. |
| 2003/0163685 A1 | 8/2003 | Paatero |
| 2003/0177389 A1 | 9/2003 | Albert et al. |
| 2003/0226015 A1 | 12/2003 | Neufeld et al. |
| 2003/0236983 A1 | 12/2003 | Mihm |
| 2004/0001101 A1 | 1/2004 | Trajkovic et al. |
| 2004/0083382 A1 | 4/2004 | Markham et al. |
| 2004/0100983 A1 | 5/2004 | Suzuki et al. |
| 2004/0209608 A1 | 10/2004 | Kouznetsov et al. |
| 2005/0071433 A1 | 3/2005 | Shah |
| 2005/0154935 A1 | 7/2005 | Jin |
| 2005/0164687 A1 | 7/2005 | DiFazio |
| 2005/0210270 A1 | 9/2005 | Rohatgi et al. |
| 2005/0245272 A1 | 11/2005 | Spaur et al. |
| 2006/0059556 A1 | 3/2006 | Royer |
| 2006/0070114 A1 | 3/2006 | Wood et al. |
| 2006/0129848 A1 | 6/2006 | Pakso et al. |
| 2006/0129948 A1 | 6/2006 | Hamzy et al. |
| 2006/0156026 A1 | 7/2006 | Utin |
| 2006/0212589 A1 | 9/2006 | Hayer et al. |
| 2006/0224742 A1 | 10/2006 | Shahbazi |
| 2007/0073694 A1 | 3/2007 | Picault et al. |
| 2007/0124797 A1 * | 5/2007 | Gupta et al. ............... 726/1 |
| 2007/0143415 A1 | 6/2007 | Daigle |
| 2007/0174389 A1 | 7/2007 | Armstrong et al. |
| 2007/0245026 A1 | 10/2007 | Martin et al. |
| 2007/0277127 A1 | 11/2007 | Carlson et al. |
| 2008/0081609 A1 | 4/2008 | Burgan et al. |
| 2008/0222711 A1 | 9/2008 | Michaelis |
| 2008/0305771 A1 | 12/2008 | Yajima et al. |
| 2009/0249457 A1 * | 10/2009 | Graff et al. ............... 726/6 |
| 2010/0024020 A1 | 1/2010 | Baugher et al. |
| 2010/0125891 A1 * | 5/2010 | Baskaran ............... 726/1 |
| 2010/0157867 A1 | 6/2010 | Babin |
| 2010/0319053 A1 | 12/2010 | Gharabally |
| 2011/0145833 A1 | 6/2011 | De Los Reyes et al. |
| 2011/0167470 A1 * | 7/2011 | Walker et al. ............... 726/1 |
| 2011/0197254 A1 * | 8/2011 | Sallaka et al. ............... 726/1 |
| 2011/0237220 A1 | 9/2011 | Matsuoka |
| 2011/0314467 A1 | 12/2011 | Pearson |
| 2012/0023573 A1 | 1/2012 | Shi |
| 2012/0054853 A1 | 3/2012 | Gupta et al. |
| 2012/0110632 A1 * | 5/2012 | Burghart ............... 726/1 |
| 2012/0185952 A1 * | 7/2012 | Jandhyala et al. ............... 726/30 |
| 2012/0202527 A1 | 8/2012 | Obradovich et al. |

FOREIGN PATENT DOCUMENTS

| | | |
|---|---|---|
| EP | 0990969 A1 | 4/2000 |
| EP | 2116952 A1 | 11/2009 |
| EP | 2144148 | 1/2010 |
| GB | 2408179 A | 5/2005 |
| WO | 9905814 A2 | 2/1999 |
| WO | 0059225 | 10/2000 |
| WO | 2005045550 A2 | 5/2005 |
| WO | 2009014975 A1 | 1/2009 |

OTHER PUBLICATIONS

Smartphone Security Beyond Lock and Wipe (Jun. 10, 2010): http://www.enterprisemobiletoday.com/article.php/3887006.

Basic Access Authentication (Feb. 8, 2010): http://en.wikipedia.org/wiki/Basic_access_authentication.

Digital Access Authentication (Feb. 7, 2010): http://en.wikipedia.org/wiki/Digest_access_authentication.

Cross-site request forgery (Dec. 6, 2008): http://en.wikipedia.org/wiki/Cross-site_request_forgery.

Extended European Search Report mailed Jul. 13, 2012, in corresponding European patent application No. 12153439.0.

"Customizing User Interaction in Smart Phones", Pervasive Computing, IEEE CS (2006) pp. 81-90 (URL: http://www.idi.ntnu.no/grupper/su/bibliography/pdf/2006/Korpipaa2006pc.pdf).

"Supporting Mobile Privacy and Security through Sensor-Based Context Detection", Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu2010-seifert.pdf).

EagleVision: A Pervasive Mobile Device Protection System, Ka Yang, Nalin Subramanian, Daji Qiao, and Wensheng Zhang, Iowa State Unviersity (URL: http://www.cs.iastate.edu/~wzhang/papers/eagleVision.pdf), Jul. 2009.

"Using context-profiling to aid access control decisions in mobile devices", Gupta et al., Nokia Research Center (URL: http://www.cerias.purdue.edu/assets/symposium/2011-posters/372-C48.pdf) Please refer to the 1-page file named 372-C48.pdf, 2011.

U.S. Appl. No. 10/524,353, office action dated Sep. 21, 2012.

Owen, Russell N., U.S. Appl. No. 10/524,353, filed Feb. 14, 2005; Title: System and Method for Secure Control of Resources of Wireless Mobile Communication Device.

Bender, Christopher Lyle; U.S. Appl. No. 13/074,136, filed Mar. 29, 2011; Title: Data Source Based Application Sandboxing.

International Application No. PCT/CA 03/01245, International Search Report dated Dec. 23, 2003.

International Application No. PCT/CA 03/01245, PCT Written Opinion, dated Apr. 23, 2004.

International Application No. PCT/CA 03/01245, PCT Written Opinion, dated Sep. 20, 2004.

International Application No. PCT/CA 03/01245, PCT International Preliminary Examination Report, dated Nov. 29, 2004.

Owen, Russell N., U.S. Appl. No. 13/371,093, filed Feb. 10, 2012; Title: System and Method for Secure Control of Resources of Wireless Mobile Communication Device.

Owen, Russell N., U.S. Appl. No. 10/524,353, filed Aug. 19, 2003; Title: System and Method for Secure Control of Resources of Wireless Mobile Communication Devices.

Olzak, Tom, IT Security (Dec. 15, 2008) "Use free sandboxing software to isolate risky behaviour". http://www.techrepublic.com/blog/security/use-free-sandboxing-software-to-isolate-risky-behavior/693.

(56) References Cited

OTHER PUBLICATIONS

Wikipedia "Operating system-level virtualization" http://en.wikipedia.org/wiki/Operating_system-level_virtualization, as captured Jan. 11, 2009 on archive.org.
Wikipedia "Solaris Containers" http://en.wikipedia.org/wiki/Solaris_Containers , as captured Apr. 1, 2010 from archive.org.
Morello, John (Oct. 2006). "Communication & Collaboration: Building an Emergency Operations Center on Groove and SharePoint". TechNet Magazine. Microsoft Corporation. http://technet.microsoft.com/en-us/magazine/2006.10.grooveandsharepoint.aspx.
Microsoft SharePoint Workspace http://en.wikipedia.org/wiki/Microsoft_SharePoint_Workspace, printed Jan. 30, 2012.
Chou, Yung (Oct. 2006). "Communication & Collaboration: Get into the Groove: Solutions for Secure and Dynamic Collaboration". TechNet Magazine. Microsoft Corporation. http://technet.microsoft.com/en-us/magazine/2006.10.intothegroove.aspx.
Lawson, Stephen, IDG News (Mar. 24, 2011) "PlayBook Will Need BlackBerry Tethering, to Start". PCWorld. http://www.pcworld.com/article/223274/playbook_will_need_blackberry_tethering_to_start.html.
Atkins, Lucas (Mar. 11, 2011) "First Look at BlackBerry Mobile HotSpot, Tethering for OS 6.1". http://n4bb.com/5027/first-look-at-blackberry-mobile-hotspot-tethering-os-6-1.
Hamblen, Matt, Computerworld (Jan. 13, 2011) "PlayBook to allow tethering to BlackBerry smartphones" http://www.computerworld.com/s/article/9204960/PlayBook_to_allow_tethering_to_BlackBerry_smartphones.
PCT application No. PCT/CA2011/001058, International Search Report and the Written Opinion of the International Searching Authority mailed Dec. 21, 2011.
Wikipedia, "Disk encryption" retrieved from http://en.wikipedia.org/wiki/Full_disk_encryption, as printed Jan. 30, 2012.
PCT application No. PCT/CA2011/001059, Corrected Version of Written Opinion of the International Searching Authority, dated Dec. 12, 2011.
PCT application No. PCT/CA2011/001059, Notification of Transmittal of the International Search Report / Written Opinion of the International Searching Authority, dated Dec. 9, 2011.
Ni, Yang et al, "DiffUser: Differentiated User Access Control on Smartphones". IEEE 6th International Conference on Mobile Adhoc and Sensor Systems, MASS '09, Oct. 12-15, 2009, pp. 1012-1017.
Oprea, Alina et al, "Securing a Remote Terminal Application with a Mobile Trusted Device", In proceeding of: Computer Security Applications Conference, 2004, pp. 438-447.
European Search Report on European Application No. 13155597.1, issued Jun. 13, 2013.

* cited by examiner

METHOD AND APPARATUS FOR MANAGEMENT OF MULTIPLE GROUPED RESOURCES ON DEVICE

FIELD OF THE DISCLOSURE

The present disclosure relates to computing devices and in particular relates to application security on the computing devices.

BACKGROUND

Computing devices, including mobile devices such as personal digital assistants, smart phones, cellular telephones, laptops, tablet computers, among others, as well as desktop or other computing devices, have the capability of running multiple applications at one time. For security purposes, a user or an IT policy for the user may dictate that the computer device lock access to the applications that are running after a period of inactivity. For example, if the user has not touched the computing device for 2 minutes, all of the applications on the device may lock. The password may, for security purposes, have policies associated with it, such as the length of time before timeout, password length, password complexity.

BRIEF DESCRIPTION OF THE DRAWINGS

The present disclosure will be better understood with reference to the drawings, in which.

DETAILED DESCRIPTION

The present disclosure provides a method for managing grouped resources on a computing device comprising: receiving, at the computing device, a policy for a set of grouped resources; applying the policy; locking at least one of the computing device or the set of grouped resources associated with the policy; waiting for receipt of an authentication parameter at the computing device; verifying the authentication parameter; associating the set of grouped resources with the authentication parameter; and unlocking the least one of the computing device or the set of grouped resources.

The present disclosure further provides a computing device capable of managing grouped resources, the computing device comprising: a processor; and a communications subsystem, wherein the computing device is capable of: receiving, at the computing device, a policy for a set of grouped resources; applying the policy; locking at least one of the computing device or the set or grouped resources associated with the policy; waiting for receipt of an authentication parameter at the computing device; verifying the authentication parameter; associating the set of grouped resources with the authentication parameter; and unlocking the least one of the computing device or the set of grouped resources.

The present disclosure provides for a mobile device, but is not meant to be limited to any particular mobile device. Examples of mobile devices can include smart phones, personal digital assistants, data enabled cellular telephones, tablet computers, among others.

Figure 1:
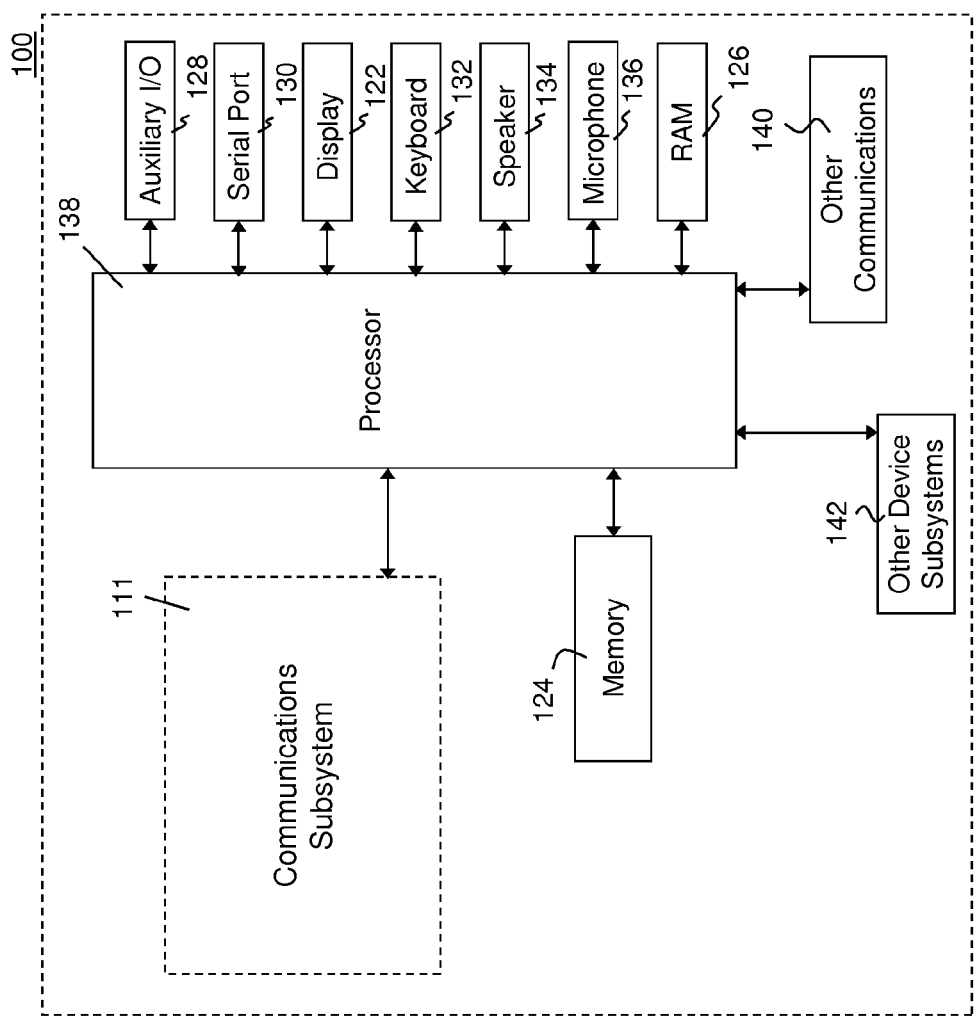
FIG. 1 is a block diagram showing an example computing device.

Reference is now made to FIG. 1, which shows a simplified diagram of a computing device 100. Computing device 100 may comprise a tablet, mobile device, personal computer, laptop computer, among others. The embodiment of FIG. 1 is however not meant to be limiting and other devices could be used.

Computing device 100 generally includes a processor 138, which controls the overall operation of the device. Processor 138 interacts with device subsystems such as the display 122, memory 124, auxiliary input/output (I/O) subsystems 128, serial port 130, one or more keyboards or keypads 132, where keyboard or keypad 132 may comprise a physical keyboard or a virtual keyboard or both, one or more speakers 134, microphone 136, other communication subsystem 140 such as a short-range communications subsystem, including Bluetooth and near field communications, and any other device subsystems generally designated as 142. Serial port 130 could include a USB port or other port.

Memory 124 may be segregated into various perimeters, as described below. As used herein, perimeters refer to groups of resources that share a common management scheme governing their use, and perimeters encompass resources and management policies that describe how they may be used. Each perimeter may have policies associated with it, where the policy controls passwords, encryption, inactivity timeouts, network access control, among other items. A perimeter may include file system resources, network (connection profiles and VPN configurations), applications, device and application configuration, certificates and policies, and perimeter policies govern what resources applications can access within and outside of the perimeter. For example, a device may have perimeters for personal applications and data, enterprise or corporate applications or data, applications or data resulting from a connection with a second device, among others. A perimeter is sometimes referred to as a set of grouped resources herein.

Operating system software used by the processor 138 may be stored in memory 124. The operating system, specific device applications, or parts thereof, may be temporarily loaded into a volatile memory such as RAM 126.

Applications may be loaded onto the device and associated with a perimeter in some cases. Such applications and data for the application may be stored in memory associated with the perimeter.

In some embodiments, computing device 100 may optionally include a communications subsystem 111 capable of communication with a data access point. Such data access point may include a cellular network or Wi-Fi or WiMAX network, among others. In further embodiments, computing device 100 may be capable of voice communications.

In certain situations, a dual or plural mode of operation or perimeters may exist for a mobile device, where the mobile device may run certain applications and access certain data in one portion that is not accessible or cannot be run in other portion or portions of the device.

Figure 2:
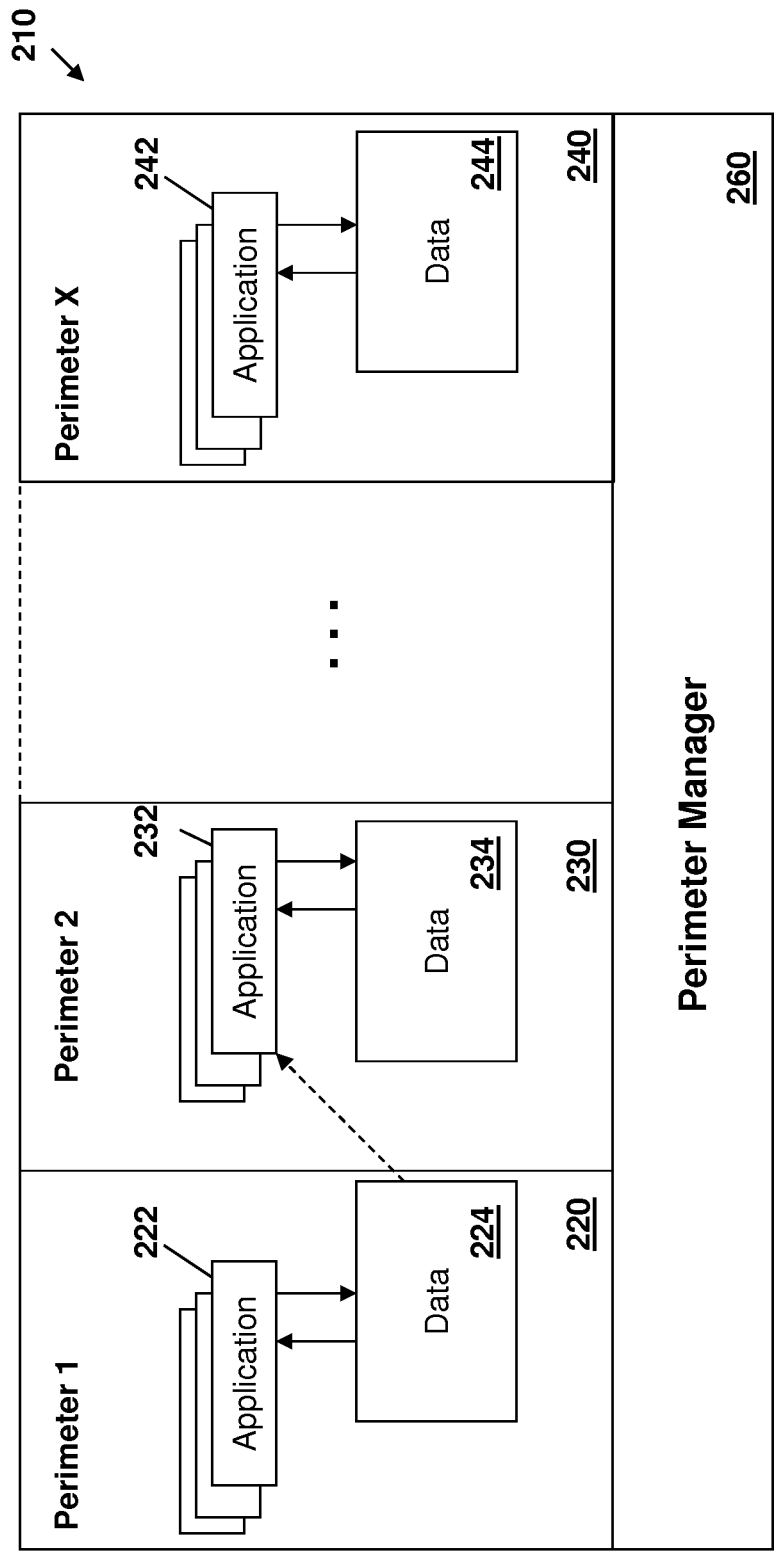
FIG. 2 is a block diagram showing application and data memory on a mobile device.

Reference is now made to FIG. 2, which shows a block diagram of the memory 210 of a mobile device. The memory is configured to store applications and application data, such combination of stored applications and data being referred to herein as an application space. The memory 210 is divided into a first perimeter 220, a second perimeter 230, and a perimeter X 240 in the example of FIG. 9, where X is the number of perimeters on the device. In one embodiment of the present disclosure, it is possible to have only two perimeters on the device. In other embodiments, there are more than two perimeters on the device.

Second perimeter 230 may, for example, be associated with a corporate mode, and thus generally comprises a portion of memory on the mobile device segregated for data, applications, or both, which may be considered sensitive to a business, corporation, enterprise, government, non-profit organization, a user of the device or any other entity setting an information technology policy for the computing device.

First perimeter 220 may, for example, be associated with a personal mode, and thus generally comprises a portion of memory segregated for personal applications and data, where personal applications or data may be considered outside of, or separate from, an information technology policy.

Other perimeters may be associated with different levels of corporate data, where certain data is considered more sensitive and thus the perimeter for this data may have a policy for passwords and inactivity timeouts that is more secure than a second corporate perimeter. Other perimeters could be associated with a bridge or connection to a device trusted by a corporate IT policy. Other examples of perimeters are possible.

Within first perimeter 220, a plurality of applications 222 can communicate with first data 224.

Similarly, in second perimeter 230, a plurality of applications 232 communicate with second data 234. In perimeter 240, a plurality of applications 242 communicate with data 244.

By segregating various applications from others and data associated with each, IT policies can be implemented on the device for certain data, thereby protecting the data, while still allowing for flexibility for other applications and data.

A perimeter manager 260 manages the policies associated with each perimeter as described in more detail below.

In one embodiment, applications 232 could be provided with additional security over applications 222. For example, before an application 232 could be launched, the user may need to enter a password. Further, inactivity timers could be implemented to lock applications 232 after a period of inactivity while leaving personal applications unlocked. A locked application may require a user to initially enter a password to unlock the application and interact with and access data from the application.

The designation of the application may further limit what data that application has access to. Thus, for example, applications 232 may run in their own mode where any data that they write can never be accessed by applications 222. The limitation would be that applications 222 are not able to read data 234, nor is an application 232 capable of writing to personal data 224. In other embodiments, applications 232 may be able to read data 224.

Data 234 may be encrypted for security. Such encryption and the storing of encryption keys may be managed on the device or externally on a trusted device or server.

Data 234 may also have date of deletion policies in effect on the mobile device. Thus, if data 234 is not accessed within a certain time period, it can be wiped out pursuant to a data reaping timeline. For example, if data is not accessed on the mobile or computing device for seven days, the data may be deleted from the mobile device. The user would then need to download the data again if it was required. This may be implemented through tags or data tables associated with the data.

An operating system on the mobile device can enforce the above differentiating rules between perimeters. For example, an operating system may implement data access for the various applications 222 and 232, where each application is given a group permission, similar to UNIX group permissions. In other embodiments, other user permissions or other permission systems may also be used. Data is further designated in files that allow access by certain groups. Thus, the operating system may allow data 234 to be accessed only by applications 232 that have group permissions to access such data. Similarly, data 224 may be written to or read only by applications 222 based on the group permissions of application 222 with regard to data 224. Applications 232 however do not have group permissions to write to data 224 in one embodiment, as enforced by the operating system.

In one embodiment, data 234 may be corporate data and be provided to a device based on a secure connection with the corporate network. For example, this may be done through a virtual private network or other secure connection to an enterprise server. The enterprise server can manage policies for perimeter 230 in the example.

Figure 3A:
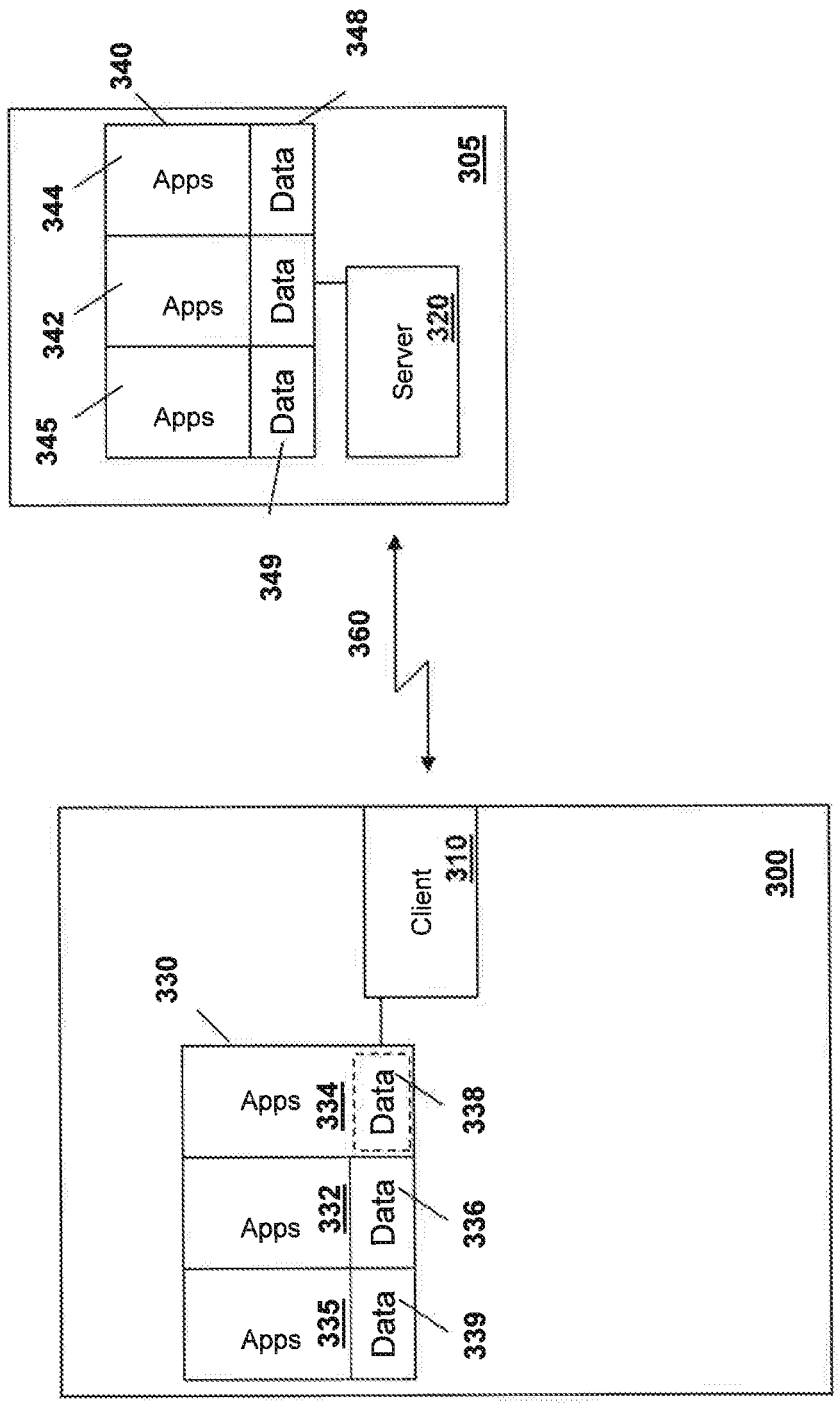
FIG. 3A is a block diagram showing the connection of a corporate device to a personal device.

In some embodiments, a particular device may be connected to a secure (IT Trusted) device. Reference is now made to FIG. 3A.

In FIG. 3A, the IT trusted device is mobile device 305. However, this is merely an example and other possibilities for IT trusted devices exist.

In order to run data from mobile device 305 on computing device 300, a client 310 may be provided on the computing device 300. Client 310 communicates with a server 320 on mobile device 305 to obtain data from the device.

Further, computing device 300 may include memory 330, which has a first perimeter space 334 for storing applications that may be run on computing device 300. In the example of FIG. 3A, first perimeter space may be considered a bridge perimeter and have policies set by mobile device 305.

Computing device 300 may also have a second perimeter 332 and a third perimeter 335 within memory 330.

As seen in the example of FIG. 3A, the second perimeter space 332 contains applications which may access data 336. However, in some embodiments no similar data exists for applications in first perimeter space 334.

In an alternative embodiment, first perimeter space 334 can have data 338 which can be regulated by the same policies as data 348 on mobile device 305. Thus, data 338 would be subject to access restrictions to specific applications, garbage collection, restrictions on copying or cutting, among the other restrictions. The client 310 can provide enablement for this functionality.

On mobile device 305, the divided modes are similarly provided. In particular, memory 340 contains applications 342, applications 344 and application 345 in the example of FIG. 3A. This is similar to the embodiments described above with regard to FIG. 2.

In one embodiment, computing device 300 may have a different number of perimeters than mobile device 305.

In order to provide security, an application 334 may be started on computing device 300. As indicated above, a password may be required to start such application, and the password may be verified at mobile device 305.

Client 310 recognizes that an application in first perimeter area 334 is running and can communicate with server 320 to indicate that data can be provided. In this way server 320 can access the data that is either in data storage 348 or at a network server (not shown).

Further, applications in first perimeter area 344 do not necessarily have to be the same as applications in first perimeter area 334. For example, with a larger display, computing device 300 may be able to run different applications or variations of applications on the mobile device 305. The data 348 may be the same between the two sets of applications, but can be displayed to the user or used by applications on the computing device differently than the data 348 would be used on mobile device 305.

The data 338 may then be provided over a connection 360 between mobile device 305 and computing device 300. Connection 360 may comprise any short or long range wired or wireless connection, and examples of such connections include Bluetooth™, USB, Infrared Data Assn (IrDA), Wi-Fi, Radio-frequency identification (RFID), Near Field Communication (NFC) connections, among others.

Communication over link 360 can be secure. That is, data that is passed to computing device 300 or back to mobile device 305 may be encrypted using a key known to both computing device 300 and mobile device 305.

Further, in one embodiment any data that is stored is encrypted. In this case, the encryption key for the stored data in a perimeter may be stored on mobile device 305, thus necessitating the connection in order to decrypt the data on the computing device 300.

Further, it may be a policy that the data is not stored on computing device 300. Thus, except for some possible caching, corporate data will not be stored on device 300. Further, client 310 can ensure that the cache is cleared prior to an application shutting down.

In a further embodiment, client 310 may communicate directly with a network server to access data that may be stored at the network server. In particular, reference is now made to FIG. 3B.

Figure 3B:
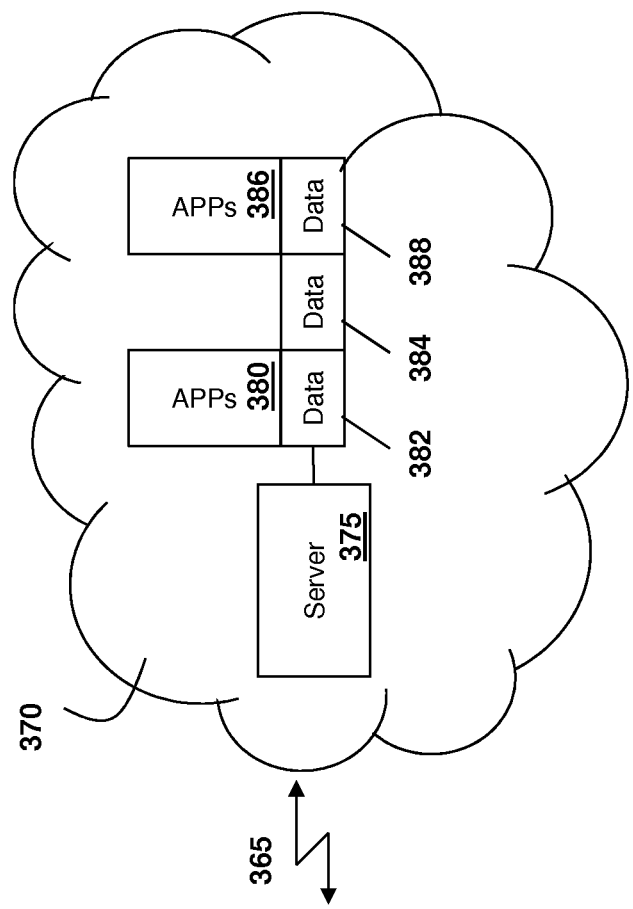
FIG. 3B is a block diagram showing the connection of a device to a network.

A computing device 300 may contain a number of perimeters, as discussed above with regard to FIGS. 2 and 3A. In the example of FIG. 3B, three perimeters are provided and are each configured with various policies for the perimeter. The perimeters are shown with the same reference numerals as FIG. 3A, namely a first perimeter having applications 335 and data 339, a second perimeter having applications 332 and data 336, and a third perimeter having applications 334 and optionally data 338.

In the example of FIG. 3B, device 300 has a client 310 for managing the perimeters. However, in alternative embodiments, a perimeter manager such as perimeter manager 260 from FIG. 2 may be used at computing device 300.

Computing device 300 communicates over a link 365 with a network element 370. Network element 370 may be any network server or combination of network servers or storage, and may for example be considered a cloud.

Link 365 may be any short or long range communications connection and may include cellular connections, Bluetooth™, USB, Infrared Data Assn (IrDA), Wi-Fi, Radio-frequency identification (RFID), Near Field Communication (NFC) connections, among others.

Network element 370 may include a server module 375 for communications with a client 310. However, such a server module is optional and in other embodiments the network element may manage access to applications and data using other modules or protocols.

Network element 370 may include applications and/or data associated with the various perimeters on computing device 300 and access to such data or applications may be managed based on perimeter policies for security and access. Thus, in the example of FIG. 3B, applications 380 and data 382 may be associated with applications 335 and data 339 on device 300. Similarly, data 384 may be associated with data 336 on device 300. In this case, applications 332 exist only on the perimeter on device 300 and no similar applications are provided within network element 370. The association of the data on the device and server could include a subset of data being stored on the device. For example, a complete music collection or picture library, among other example of data, could be stored on the server and only a subset stored on the device. In other examples, the server may contain only a subset of the data on the device. For example, if data is backed up to the server, only some of the data on the device may be backed up.

Further, applications 386 and data 388 on network element 370 may be associated with applications 334 and data 338 on computing device 300.

In some cases data, such as data 339, 336 or 338 on computing device 300 may form only a subset of data 382, 384 and 388 on network element 370. For example, if data 382 is a music collection on a cloud storage, data 339 on computing device 300 may only contain a subset of the music a user is currently listening to. In other cases, there may be no data 339 stored on computing device 300 and computing device 300 may stream the music directly from network element 370.

One example of the embodiment of FIG. 3B could be cloud storage of data and applications for various perimeters. The perimeters may be broken into personal and corporate perimeters and may also be broken into perimeters based on users of the device. Thus, for example, computing device 300 may be a device used by more than one member of a family, where a first member has one or more personal perimeters and one or more corporate perimeters and a second member has one or more personal perimeters and one or more corporate perimeters. In this case, various data or applications on network element 370 may be shared between users, but other data may be secured and inaccessible by other family members sharing the device. Further, work or corporate perimeters for a particular family member may be managed based on corporate perimeter policies and access to data and applications may be restricted. In this case, a separate password for the perimeter may be established.

In other cases, perimeters may be established as individual perimeters and other perimeters may be established as shared perimeters. For example, a music application and data may be in a perimeter shared by various family members, but each family member may have a personal perimeter containing an email application and address book, thereby allowing the various users to keep addresses and emails separate, but to share the music collection.

Policies for the various perimeters may be set on computing device 300, network element 370, or some other network element such as an enterprise server. In the case of an enterprise server or other network element setting the policies for the perimeter, such policies may be sent to one or both of computing device 300 and network element 370.

Other examples are possible.

When enterprise perimeters are created on the device, they are associated with policies that are used to control the access to those perimeters. Additional perimeters can be pushed to the device. In some embodiments, the perimeters are created as encrypted perimeters with access to these perimeters controlled by a password. The encryption may be done, for example, when the perimeters contain data that is enterprise sensitive.

The encrypted file system perimeters are available only when an appropriate password that can be used to generate a key is entered and has been authenticated to unlock the file system underneath. Each individual perimeter requires separate authentication to be able to generate a key to unlock the file system corresponding to that perimeter. The generation of the key may utilize a password for either the device, the perimeters, or for a group of perimeters.

When the system comes out of a reboot, the file system is locked, and is considered to be in a state of "hard lock". At this point, no data can be read from the file system. Once the system has started, and the user has authenticated to the system at least once, the perimeters will move between states of being "unlocked" to being "soft-locked". When the perimeters are "soft locked", none of the applications that provide access to the perimeters can be accessed until the appropriate password is entered for the perimeter. The perimeters can be locked (soft-locked) by either the user, or because of inactivity timeouts. When a device is "soft-locked", system services that have been previously authenticated by the system, that are already running, may still be able to access the perimeters in a similar manner to when the perimeter is "unlocked". Such system services can provide aggregation services (like e-mail) or notification services, even when the perimeter is "soft-locked".

Figure 4:
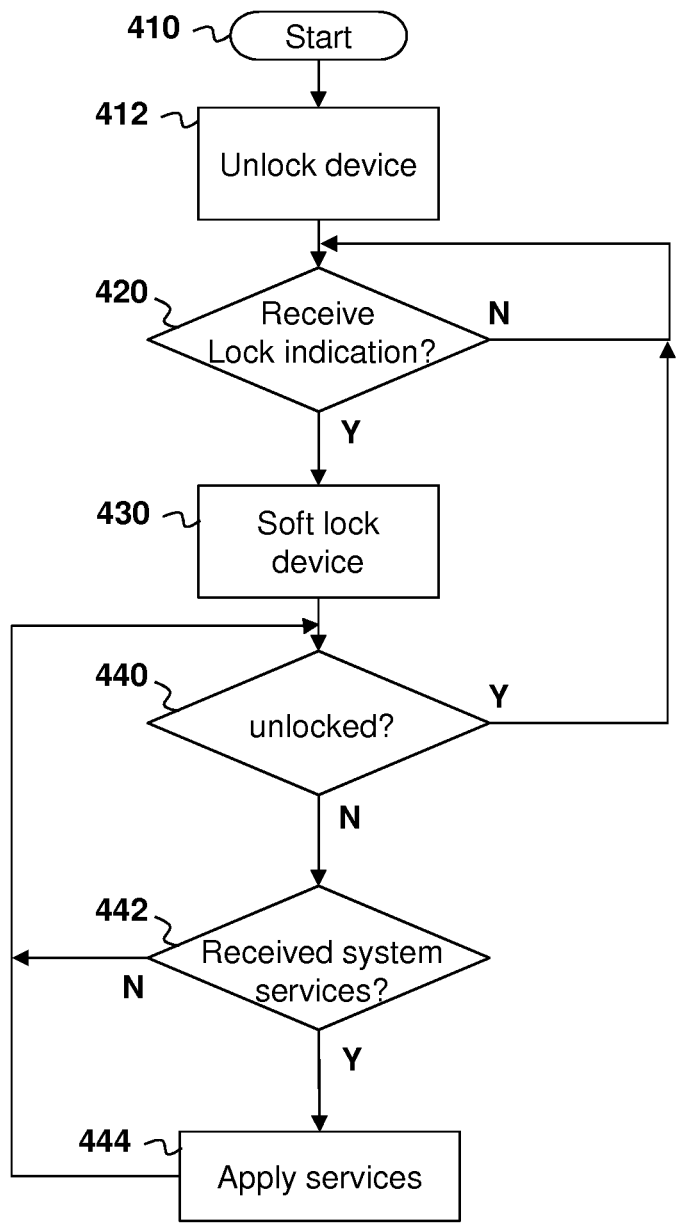
FIG. 4 is a flow diagram for soft locking of a mobile device.

Reference is now made to FIG. 4. FIG. 4 shows an example of a soft lock process on the device. In particular, the process of FIG. 4 starts at block 410, where the device is in a hard lock state, meaning that the data on the device is encrypted and inaccessible.

The process then proceeds to block 412 in which the device is unlocked. The unlocking of the device is typically performed by receiving an authentication parameter such as a password, which is then typically hashed and compared with a stored hash value on the device. However, other password verification or security verification is possible, including physical verification such as fingerprint, gesture, among others.

The process then proceeds to block 420 in which a check is made to determine whether a lock indication has been received on the device for either the device or a perimeter on the device. The lock indication can be an inactivity timeout expiring or a manual lock from a user interface, among other examples.

If a lock indication is not received at block 420, the process continues to loop until a lock indication is received. Once the lock indication is received the process proceeds to block 430 in which the device, or subset of the device, is soft locked. As indicated above, applications that are running and have specific permissions may still access data and write data while the device is in a soft lock, while other applications are prevented from running or accessing data.

The process then proceeds to block 440 in which a check is made to determine whether the device or perimeter has been unlocked. The unlocking of the device is again typically based on a password entry on the device.

From block 440 the process proceeds to block 442 if the device or perimeter is not unlocked. At block 442 a check is made to determine whether any running application with privileges has made a data request. If yes the process proceeds to block 444 in which the data request is applied. The application of the data request at block 444 may include reading or writing to or from data locations on the device.

From block 444 the process loops back to block 440. Similarly from block 442, if no applications are making data requests the process loops to block 440.

From block 440 once an unlock is received the process proceeds to block 420 and continues to loop.

Figure 3B:
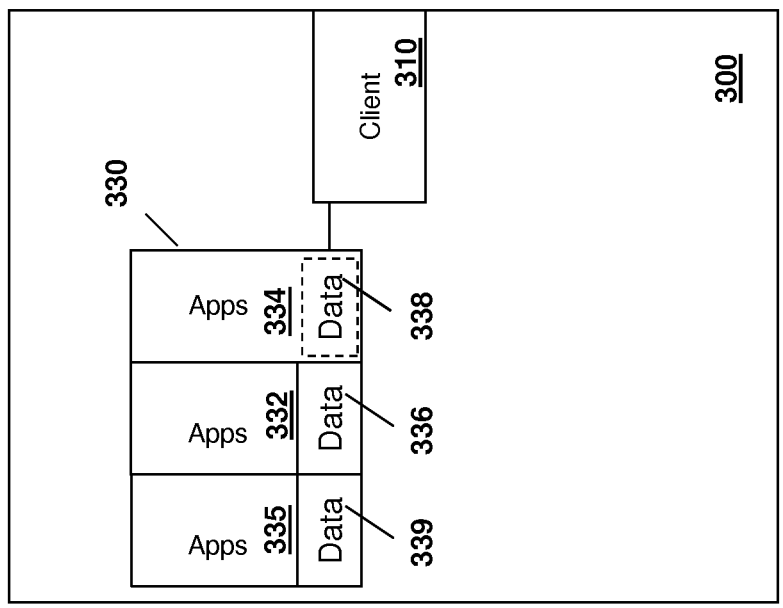

As indicated above with regard to FIGS. 2 and 3, there can be multiple perimeters on the device. These may, for example include bridge or enterprise perimeters. Each of these can have a different policy for control.

For example, enterprise perimeters may have policies pushed to the device from a remote endpoint. The policies are managed and validated on the device, by the perimeter manager. The remote endpoint can send management commands to the device, updating policies for the password, or locking the device, or even changing/resetting the password, without user intervention. In some cases, policies can be consolidated to have a secure policy for a perimeter to provide overriding access control to data on the computing device. In other embodiments, each perimeter may be managed individually based on a policy for that perimeter. The device may be switched between the security settings dynamically.

Whenever policy changes are pushed to the device, the perimeter transitions to a "soft-locked" state, requiring the user authentication and validation of passwords against the password policy rules.

In a further example, a bridge perimeter may have policies managed on a mobile device, such as mobile device 305 from FIG. 3, with password verification and authentication provided by the mobile device. All of the password policy, validation and authentication is performed on the mobile device, while the perimeter manager on the computing device controls the state of the perimeter (e.g. hard-lock, soft-lock, unlocked).

Individual perimeters may be controlled and managed individually by the perimeter manager. They can be managed on device or remotely.

In one embodiment, perimeters can time out and lock or be locked manually independent of each other. Enterprise policy pushed down to a device that is managed locally on the device by a remote endpoint, can also choose to enforce password policies on the device password also. When this is the case, enterprise policies for the password on the device may need to be adhered to. In this case, the password for the perimeter is synchronized with the device password. Unlocking the device also unlocks the perimeter.

When a change is made to a password on the perimeter on the device, the device password is also automatically changed, keeping the passwords synchronized. The enterprise may choose to change the policy that manages the device, and when these policies are pushed down to the perimeter, the perimeter transitions to a "soft" locked state that requires the user unlock the perimeter to access any perimeter resources.

When the policies apply to the device equally, the device and perimeter are locked at the same time. Anytime the policy changes, authentication is required based on an existing password with the new policy before access is granted to any perimeter resources. This requirement is enforced even across a reboot, until the password is validated at least once against the new policies.

Figure 5:
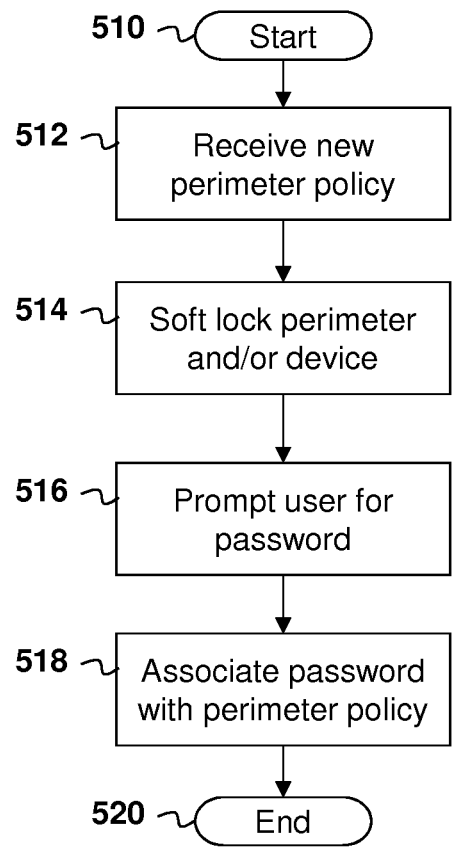
FIG. 5 is a flow diagram showing the association of a password with a perimeter policy.

When there are multiple perimeters deployed to the device, there can be cases when the managing enterprise for these perimeters is in fact the same. For example, an enterprise pushes the enterprise perimeter to the device, and the enterprise also manages the phone associated with the bridge perimeter. In this scenario, the enterprise and bridge may be "equivalent". When this is in fact the case, any applications that are launched with access to the either one of these perimeters is provided all the privileges to access the other perimeter also. Since the two perimeters are managed by different passwords, the applications may still require authentication with the appropriate password to access resources in a specific perimeter. This will be required whenever the perimeter is "hard" or "soft" locked Reference is now made to FIG. 5. The process of FIG. 5 starts at block 510 and proceeds to block 512 in which a new perimeter policy is received by the policy manager on the device. The new perimeter policy can relate to an existing perimeter on the device or relate to a new perimeter for the device.

From block 512 the process proceeds to block 514 in which a soft lock is performed for the perimeter and/or the device. As used herein, a soft lock prevents access to data by applications in general, but permits certain applications which are already running and which have correct permissions specified to continue to read or write data. Examples of the certain applications with correct permissions may include system services or core applications, among others.

The process at block 514 may simply lock applications or data relating to a perimeter. In this case the device may continue to function for other perimeters. This may be implemented, for example, when a new policy is provided for an existing perimeter. Conversely, the process at block 514 may lock the entire device requiring a password to be entered to unlock the device.

From block 514 the process proceeds to block 516 in which a prompt is provided to enter a password. The password may be for the device, perimeter or both.

Once the password has been successfully entered the process proceeds to block 518 in which the password is associated with the perimeter policy. The password may be used to generate a key to encrypt or decrypt data relating to the perimeter.

In accordance with the above the association of the password at block 518 may allow the device password to unlock the perimeter.

The process then proceeds from block 518 to block 520 and ends.

In certain embodiments of the present disclosure it may be desirable for a password and timeout period to be consolidated among the various perimeters on the device. Such password policies and time out policies for each perimeter are typically found within the perimeter policies.

The consolidation of the password and timeout period allows one password to be used among the plurality of perimeters while ensuring that the password meets the policy requirements for all of the perimeters. Similarly, one inactivity time out can be used for the device which conforms to the inactivity timeout policies of all of the perimeters. This consolidated inactivity time out would be such that it adheres to the strictest of all the individual inactivity time out policies of all the perimeters.

Figure 6:
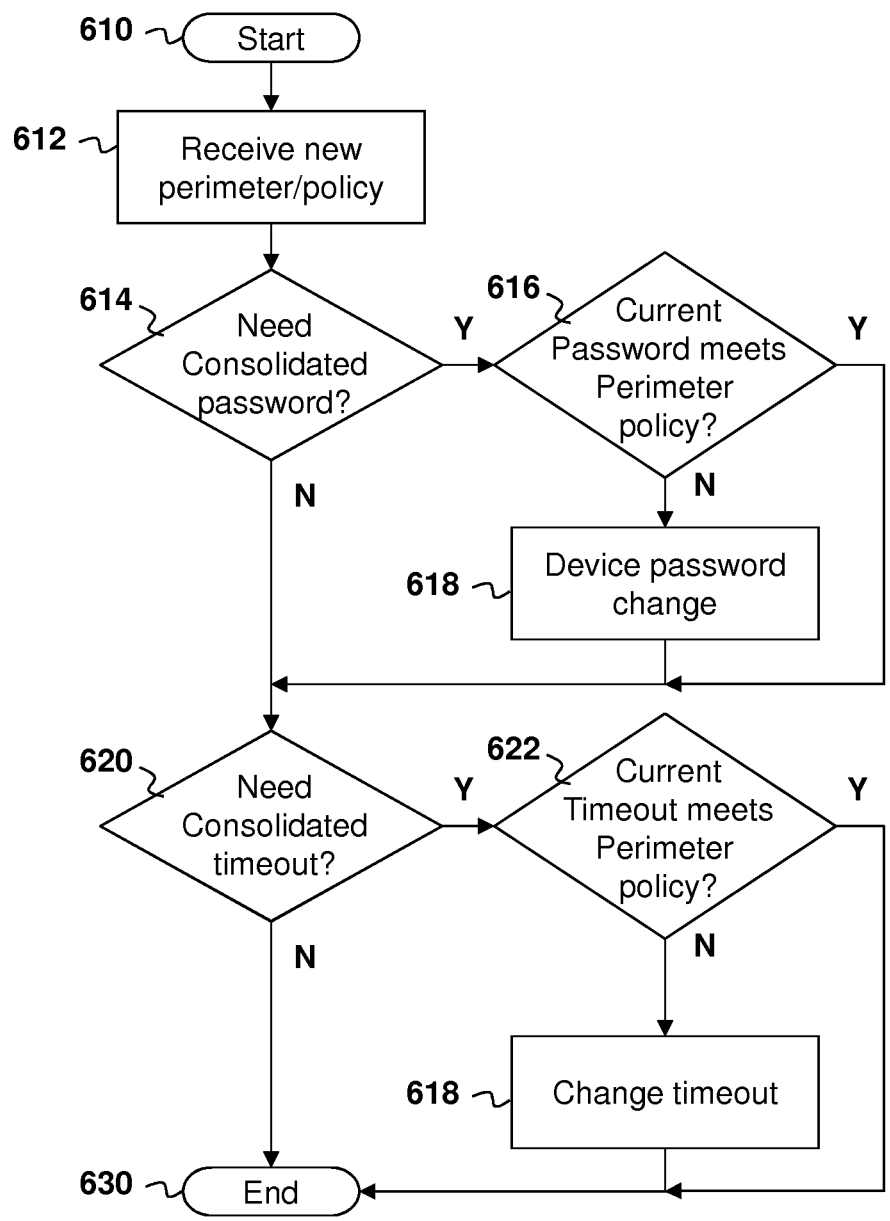
FIG. 6 is a flow diagram showing consolidation of password and timeout values on a device.

Specifically, reference is now made to FIG. 6. The process of FIG. 6 starts at block 610 and proceeds to block 612 in which a new perimeter policy is received at the device. The new perimeter policy may be associated with an existing perimeter on the device or may be for a new perimeter for the device.

From block 612, the process proceeds to block 614 in which a determination is made regarding the need for a consolidated password on the device. Specifically, in some embodiments different perimeters can have different passwords. However in other embodiments a single password for the device may be used.

From block 614, if a consolidated password is needed, the process proceeds to block 616 in which a check is made to determine whether a current device password meets the password policies within the perimeter policy. Specifically, the current device password may need to be a certain length, contain a variety of character types, or other factors may need to be present within the password.

In particular, various parameters of the policy may include password complexity, inactivity timeouts, policy governing the movement of data between perimeters, etc. This list is not exhaustive, and can include other policy parameters as well.

From block 616, if the current device password does not meet the perimeter policy, the process proceeds to block 618 in which a new password for the device is set. The new password would need to meet the requirements under the consolidated perimeter policies.

From block 614, if a consolidated password is not required, from block 616 if the current device password meets the perimeter policy, or from block 618, the process proceeds to block 620 in which a check is made to determine whether a consolidated inactivity timeout is required. For example, a policy may require that the device lock after five minutes of inactivity. Another policy may require that the device lock after fifteen minutes of inactivity. In order to have a single inactivity timeout, a consolidated inactivity time period may be established on the device. Further, a user of the device can set an inactivity period that it is shorter than the consolidated value. In other embodiments, only a subset of perimeters fall under the consolidated timeout. Thus, for example, all perimeters associated with an enterprise may have a timeout that is consolidated, but a personal perimeter might have a different or no timeout.

From block 620, if a consolidated time out is required the process proceeds to block 622 and checks whether the current consolidated time out meets the perimeter policy time out. If no, the process proceeds to block 624 in which the consolidated time out value is changed to the value found in the current perimeter policy.

From block 620, if no consolidated time out is required, or from block 622 if the current consolidated time out has a value that is lower than the perimeter policy timeout value, or from block 624, the process proceeds to block 630 and ends.

After the password policies have been set and/or a consolidated timeout value established, if a user tries to change the password or inactivity time out period for the device a check is made to determine whether the new password or inactivity time out value falls within the consolidated policies.

Figure 7:
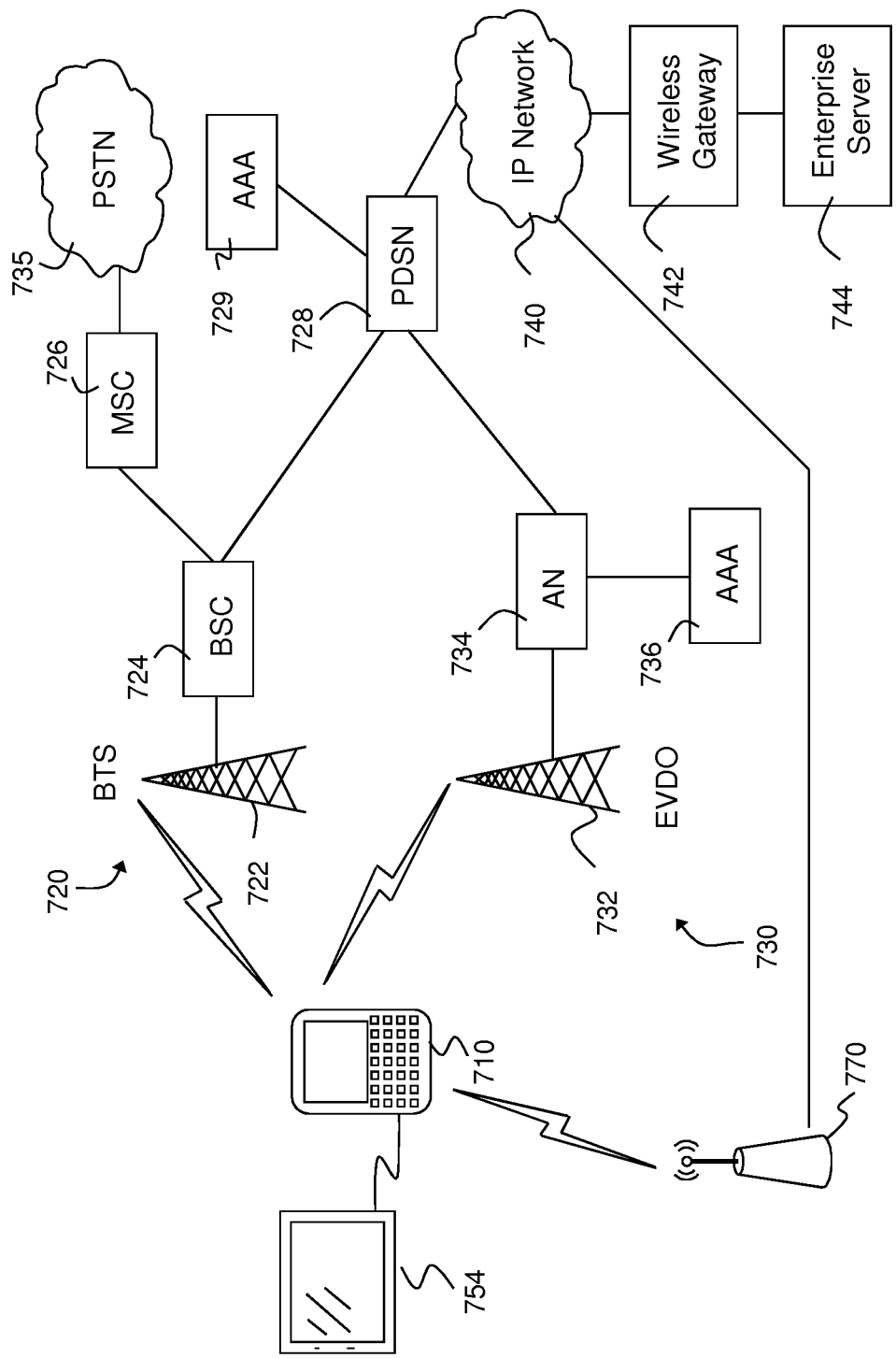
FIG. 7 is an example system architecture diagram for a mobile device.

One system architecture capable of being used with the above embodiments is shown with regard to FIG. 7. The architecture of FIG. 7 is however not meant to be limiting and other system architectures are possible.

Reference is now made to FIG. 7, which shows a block diagram of an example wireless data network in accordance with the present disclosure and with which the various embodiments of the methods of the instant disclosure may cooperate. FIG. 7 shows a block diagram of a mobile device 710 and example Code Division Multiple Access (CDMA) 1x network 720, an example Evolution Data Only (EVDO) network 730, a public switched telephone network (PSTN) 735, a data network 740, wireless gateway 742 and enterprise server 744. This is shown merely as an example, and other network architectures, such as Global System for Mobile (GSM), GSM Packet Radio Service (GPRS), Universal Mobile Telecommunications Service (UMTS), Long Term Evolution (LTE), LTE Advanced (LTE-A), High Speed Downlink Packet Access (HSDPA), Wi-Fi, WiMAX, among others, are possible.

The mobile device 710 may comprise a two-way communication device having data and voice communication capabilities. FIG. 7 further shows an access point 770 for use with an alternative data connection such as a Wi-Fi or WiMAX connection. CDMA network 720 is comprised of a base transceiver station (BTS) 722 and a base station controller (BSC) 724. Base station controller 724 communicates with a mobile switching center 726 which, as will be appreciated, is a circuit switched only component communicating with PSTN 735. Base station controller 724 further communicates with a packet data serving node (PDSN) 728 which is a packet switched only component. PDSN 728 further communicates with IP network 740.

EVDO network 730 contains an EVDO sector 732 which communicates with access node (AN) 734. Since the EVDO network 730 is a data only network, access node 734 communicates only with PDSN 728 and not with any circuit switch components.

An authentication, authorization and accounting node 736 is associated with AN 734, and a similar node 729 is associated with PDSN 728.

Operationally, mobile device 710 communicates wirelessly with CDMA network 720 using BTS 722 and BSC 724 to gain access to the CDMA 1x network.

Mobile device 710 sends and receives both data and voice services through CDMA network 720 until an EVDO network connection with established, at which point data can be transmitted over the EVDO network connection.

Further, mobile device 710 can be connected to a computing device 754 such as a tablet for a variety of reasons, some of which are provided above. The connection may be through various means such as a Universal Serial Bus (USB) or other serial port, or by short range wireless communications with a computing device 754. Computing device 754 can then gain access to data network 740 and to enterprise server 744 through EVDO network 730 or CDMA network 720 using mobile device 710. In other embodiments, computing device 754 may also be capable of accessing networks 720, 730 or 770 directly.

Mobile device 710 may further have capabilities to communicate through access point 770 using, for example, Wi-Fi. Access point 770 connects to a data network 740 and thus access to wireless gateway 742 and enterprise server 744 are possible through access point 770

In one embodiment, enterprise server 744 can provide both the IT policies for the mobile device 710 and also provide access to a permanent store of the corporate data which can be accessed by mobile device 710.

The embodiment of FIG. 7 is merely an example and other network architectures are possible for mobile device 710 to connect to enterprise server 744. The embodiment of FIG. 7 is not meant to be limiting to any particular network architecture.

Further, mobile device 710 may not be a dual mode or multi-mode device that allows connection to Wi-Fi. In this case, the Wi-Fi connection to access point 770 would be removed from the embodiment of FIG. 7 and all communication may proceed over the cellular network through the base station 722 or 732. In other embodiments, mobile device 710 may only have access through an access point 770 and thus the cellular network would be removed from FIG. 7. Other possibilities would be apparent to those skilled in the art having the benefit of the present disclosure.

Computing device 754, may, in some embodiments, comprise a personal computing device. For example, computing device 754 may comprise a tablet computer. The user may further wish to use computing device 754 for corporate functions. However, for security reasons, the corporate IT department may not consider the computing device 754 to be a secure destination for data, since it is a personal device.

Figure 8:
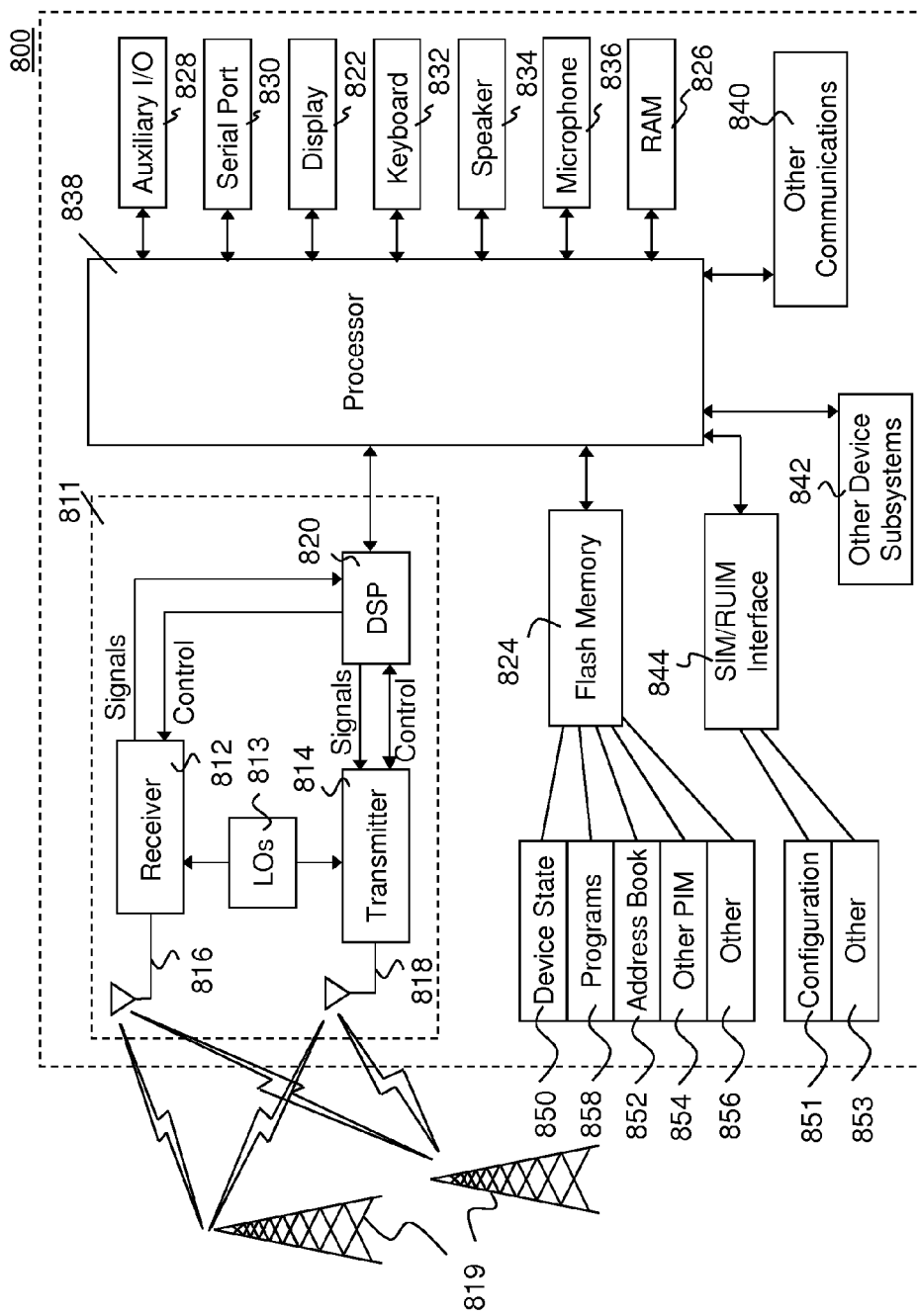
FIG. 8 is a block diagram showing an example mobile device capable of being used with the present disclosure.

The device of FIG. 1 can be a mobile device. One such example mobile device is illustrated below with reference to FIG. 8. The mobile device of FIG. 8 is however not meant to be limiting and other mobile devices can also be used.

Mobile device 800 may comprise a two-way wireless communication device having any of voice communication capabilities, data communication capabilities, or both. Mobile device 800 generally has the capability to communicate with other devices or computer systems. Depending on the exact functionality provided, the mobile device may be referred to as a data messaging device, a two-way pager, a wireless e-mail device, a cellular telephone with data messaging capabilities, a wireless Internet appliance, a wireless device, a user equipment, a tablet, or a data communication device, as examples.

Where mobile device 800 is enabled for two-way communication, it may incorporate a communication subsystem 811, including both a receiver 812 and a transmitter 814, as well as associated components such as one or more antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate.

Network access requirements will also vary depending upon the type of network 819. In some networks, network access is associated with a subscriber or user of mobile device 800. A mobile device may require a removable user identity module (RUIM) or a subscriber identity module (SIM) card in order to operate on the network. The SIM/RUIM interface 844 may be similar to a card-slot into which a SIM/RUIM card can be inserted and ejected like a diskette or PCMCIA card. The SIM/RUIM card can have memory and hold many key configuration 851, and other information 853 such as identification, and subscriber related information.

When required network registration or activation procedures have been completed, mobile device 800 may send and receive communication signals over the network 819. As illustrated in FIG. 8, network 819 can consist of multiple base stations communicating with the mobile device. For example, in a hybrid CDMA 1x EVDO system, a CDMA base station and an EVDO base station communicate with the mobile station and the mobile device is connected to both simultaneously. In other systems such as Long Term Evolution (LTE) or Long Term Evolution Advanced (LTE-A), multiple base stations may be connected to for increased data throughput. Other systems such as GSM, GPRS, UMTS, HSDPA, among others are possible and the present disclosure is not limited to any particular cellular technology.

Signals received by antenna 816 through communication network 819 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile device 800 generally includes a processor 838 which controls the overall operation of the device. Communication functions, including data and voice communications, are performed through communication subsystem 811. Processor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. Serial port 830 can include a USB port or other port known to those in the art having the benefit of the present disclosure.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list, among other applications.

Operating system software used by the processor 838 may be stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. The applications may be segregated based on the mode or category they fall into. Memory 824 may further provide security for corporate data and if some applications are locked while others are not.

Processor 838, in addition to its operating system functions, may enable execution of software applications on the mobile device. A predetermined set of applications that control basic operations, including data or voice communication applications for example, as well as a predetermined set of certificates, will normally be installed on mobile device 800 during manufacturing. Other applications can be installed subsequently or dynamically.

Applications and software, such as those described above may be stored on any computer readable storage medium. The computer readable storage medium may be a tangible or intransitory/non-transitory medium such as optical (e.g., CD, DVD, etc.), magnetic (e.g., tape) or other memory known in the art.

One example software application may be a personal information manager (PIM) application having the ability to organize and manage data items relating to the user of the mobile device such as, but not limited to, e-mail, calendar events, voice mails, appointments, and task items. Further applications, including, but not limited to, a media player, camera, messenger, mail, calendar, address book, web browser, social networking, game, electronic book reader, map, or other application may also be loaded onto the mobile device 800 through the network 819, an auxiliary I/O subsystem 828, serial port 830, short-range communications subsystem 840 or any other suitable subsystem 842, and installed by a user in the RAM 826 or a non-volatile store (not shown) for execution by the processor 838. Such flexibility in application installation increases the functionality of the device and may provide enhanced on-device functions, communication-related functions, or both. For example, secure communication applications may enable electronic commerce functions and other such financial transactions to be performed using the mobile device 800.

In a data communication mode, a received signal such as a text message or web page download will be processed by the communication subsystem 811 and input to the processor 838, which may further process the received signal for output to the display 822, or alternatively to an auxiliary I/O device 828.

A user of mobile device 800 may also compose data items such as email messages for example, using a keyboard 832, which may comprise a virtual or physical keyboard or both, and may include a complete alphanumeric keyboard or telephone-type keypad, among others, in conjunction with the display 822 and possibly an auxiliary I/O device 828. Such composed items may then be transmitted over a communication network through the communication subsystem 811.

For voice communications, overall operation of mobile device 800 is similar, except that received signals would typically be output to one or more speakers 834 and signals for transmission would be generated by a microphone 836. Alternative voice or audio I/O subsystems, such as a voice message recording subsystem, may also be implemented on mobile device 800. Although voice or audio signal output may be accomplished primarily through the one or more speakers 834, display 822 may also be used to provide an indication of the identity of a calling party, the duration of a voice call, or other voice call related information for example.

Serial port 830 in FIG. 8 would normally be implemented in a personal digital assistant (PDA)-type mobile device for which synchronization with a user's desktop computer (not shown) may be desirable, but is an optional device component. Such a port 830 would enable a user to set preferences through an external device or software application and would extend the capabilities of mobile device 800 by providing for information or software downloads to mobile device 800 other than through a wireless communication network. The alternate download path may for example be used to load an encryption key onto the device through a direct and thus reliable and trusted connection to thereby enable secure device communication. As will be appreciated by those skilled in the art, serial port 830 can further be used to connect the mobile device to a computer to act as a modem.

Other communications subsystems 840, such as a short-range communications subsystem, are further optional components which may provide for communication between mobile device 800 and different systems or devices, which need not necessarily be similar devices. For example, the subsystem 840 may include an infrared device and associated circuits and components, near field communications (NFC) or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for managing grouped resources on a computing device comprising:
   receiving, at the computing device, a new policy for a set of grouped resources;
   applying the policy at the computing device;
   on receipt of the received policy, locking, at the computing device, at least one of the computing device or the set of grouped resources associated with the received policy;
   waiting for receipt of an authentication parameter at the computing device;
   verifying, at the computing device, the authentication parameter;
   associating, at the computing device, the set of grouped resources with the authentication parameter; and
   unlocking the at least one of the computing device or the set of grouped resources at the computing device.

2. The method of claim 1, wherein each set of grouped resources on the device has a policy associated therewith.

3. The method of claim 2, wherein a plurality of policies is managed at a manager on the computing device.

4. The method of claim 1, wherein the authentication parameter is a password.

5. The method of claim 1, wherein the locking prevents new applications from being launched on the computing device.

6. The method of claim 5, wherein the locking allows applications already running and having access privileges to access data on the device.

7. The method of claim 1, wherein the associating generates a key based on the authentication parameter.

8. The method of claim 7, wherein the key is different for different sets of grouped resources.

9. The method of claim 1, wherein the associating further consolidates policies for a plurality of sets of grouped resources.

10. The method of claim 9, further comprising checking whether a current password on the computing device complies with the consolidated policies.

11. The method of claim 10, further comprising initiating a password change if the current password on the computing device does not comply with the consolidated policies.

12. The method of claim 9, further comprising checking whether an inactivity timer value on the computing device complies with the consolidated policies.

13. The method of claim 12, further comprising initiating an inactivity timer value change if the inactivity timer value on the computing device does not comply with the consolidated policies.

14. The method of claim 1, wherein the verifying is done on the computing device.

15. The method of claim 1, wherein the verifying is done on a remote device or server.

16. A computing device capable of managing grouped resources, the computing device comprising:
   a processor;
   memory; and
   a communications subsystem,
   wherein the computing device is configured to:
      receive, at the computing device, a new policy for a set of grouped resources;
      apply the policy at the computing device;
      receipt the new policy, lock at least one of the computing device or the set of grouped resources associated with the new policy;
      wait for receipt of an authentication parameter at the computing device;
      verify the authentication parameter at the computing device;
      associate the set of grouped resources with the authentication parameter at the computing device; and
      unlock the at least one of the computing device or the set of grouped resources at the computing device.

17. The computing device of claim 16, wherein each set of grouped resources on the device has a policy associated therewith.

18. The computing device of claim 17, wherein a plurality of policies is managed at a manager on the computing device.

19. The computing device of claim 16, wherein the authentication parameter is a password.

20. The computing device of claim 16, wherein the locking prevents new applications from being launched on the computing device.

21. The computing device of claim 20, wherein the locking allows applications already running and having access privileges to access data on the device.

22. The computing device of claim 16, wherein the associating generates a key based on the authentication parameter.

23. The computing device of claim 22, wherein the key is different for different sets of grouped resources.

24. The computing device of claim 16, wherein the associating further consolidates policies for a plurality of sets of grouped resources.

25. The computing device of claim 24, further configured to check whether a current password on the computing device complies with the consolidated policies.

26. The computing device of claim 25, further configured to initiate a password change if the current password on the computing device does not comply with the consolidated policies.

27. The computing device of claim 24, further configured to check whether an inactivity timer value on the computing device complies with the consolidated policies.

28. The computing device of claim 27, further configured to initiate an inactivity timer value change if the inactivity timer value on the computing device does not comply with the consolidated policies.

29. The computing device of claim 16, wherein the computing device is one of a mobile device, a tablet computer, a laptop computer or a desktop computer.

* * * * *